(No Model.)
L. W. ELLIS.
SHEAF CARRIER FOR HARVESTERS.
No. 401,259. Patented Apr. 9, 1889.
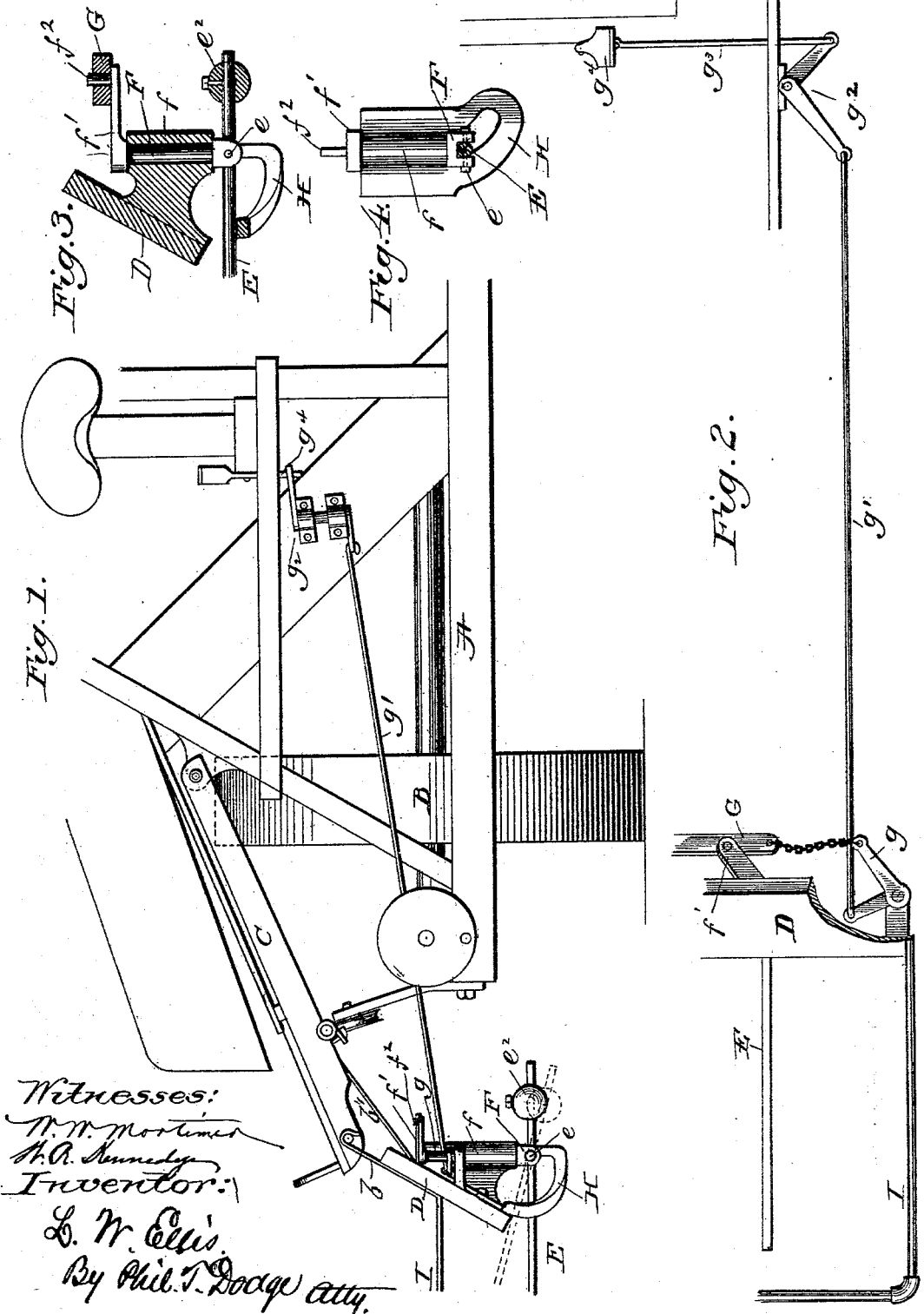
Witnesses:
W. W. Mortimer
W. A. Kennedy
Inventor:
L. W. Ellis
By Phil. T. Dodge atty.

UNITED STATES PATENT OFFICE.

LUCIEN W. ELLIS, OF ANAMOSA, IOWA, ASSIGNOR TO WILLIAM DEERING & COMPANY, OF ILLINOIS.

SHEAF-CARRIER FOR HARVESTERS.

SPECIFICATION forming part of Letters Patent No. 401,259, dated April 9, 1889.

Original application filed November 20, 1885, Serial No. 183,395. Divided and this application filed July 18, 1888. Serial No. 280,258. (No model.)

*To all whom it may concern:*

Be it known that I, LUCIEN W. ELLIS, a citizen of the United States, residing at Anamosa, in the county of Jones and State of Iowa, have invented certain new and useful Improvements in Sheaf-Carriers for Grain Harvesting and Binding Machines, (originally described and claimed in application, Serial No. 183,395, filed November 20, 1885, of which this application is a division,) of which the following is a specification.

This invention relates to that class of attachments which are used on grain harvesting and binding machines for the purpose of receiving the bound bundles or sheaves as they are delivered from the binder, carrying them until they are accumulated in sufficient numbers to form a shock, and then discharging the entire number simultaneously.

Generally speaking, the carrier consists of a series of sheaf-receiving fingers which project normally in a lateral direction below and beyond the binder, and which are so jointed or hinged that their outer ends may swing downward, rearward, and toward the machine, in order to deliver the accumulated bundles and to close compactly together.

Specifically, the present device consists of fingers which are individually pivoted to rise and fall and to swing horizontally at their outer ends, combined with stationary tracks or cams, over which they ride and by which they are guided in spiral paths as they swing forward and backward.

In the accompanying drawings, Figure 1 is an end elevation of a carrier constructed in accordance with my invention. Fig. 2 is a top plan view showing the device under the control of the driver for effecting the movement of the fingers. Fig. 3 is a vertical axial section through one of the fingers and its supporting device. Fig. 4 is a rear elevation of the same.

In the accompanying drawings, A represents the frame of a harvester; B, the main or ground wheel over which the cut grain is delivered by the usual elevating mechanism; C, the grain-table on which the sheaves are bound and from the lower outer edge of which they are delivered.

The foregoing parts are constructed and operate in the ordinary manner and form no part of my invention.

D represents a bar mounted in a fore-and-aft direction below the outer edge of the binder-table, being sustained rigidly in position in any suitable manner—such, for example, as arms $b$ $b'$ attached thereto and hooked to the binder-frame.

E represents the sheaf-carrying fingers to which my invention relates. Each finger consists of a small steel rod or wire passed at its inner end through the lower forked end of a vertical shaft or journal, F, and connected thereto by a horizontal pivot, $e$, this attachment permitting the outer end of the finger to rise and fall. The shaft F is mounted to turn freely in a block or bearing, $f$, attached to the sustaining-bar D. Its rotation permits the outer end of the finger E to swing horizontally. The upper end of each shaft F is provided with a crank-arm, $f'$, and this series of cranks is connected, as shown in Fig. 2, by a bar, G, applied to the crank-pins $f^2$, or otherwise suitably connected. In this manner all the teeth are compelled to swing forward or rearward in unison.

Each tooth rides outside of the pivot upon a stationary cam or track, H, which serves to sustain the outer end of the tooth, and which is inclined or curved downward toward the rear, that as the tooth swings rearward it is permitted to descend gradually. In other words, the cams compel the teeth to swing forward and backward in a spiral path, their outer ends descending as they move rearward and rising as they move forward. In order to lift the outer ends of the teeth clear of the ground as soon as they are relieved from the weight of the bundles, they are projected inward beyond their pivots and provided each with an adjustable counter-weight, $e^2$. The forward and backward motion of the teeth may be effected by any suitable mechanism under the control of the driver; but I commonly connect the bar G by a link or chain to an elbow-lever, $g$, which is in turn connected by a rod, G', to a second elbow-lever, $g^2$, mounted on the harvester-frame and connected in its turn by a rod, $g^3$, to the lower end of a foot-lever, $g^4$, pivoted midway of its length at a point adjacent to the driver's seat. When the upper end of this lever is pressed forward, the intermediate parts act to swing the fingers forward and upward until they stand in an elevated position at right angles to the path in which the machine advances and in position to receive the sheaves. When the lever is released, the weight of the bundles causes the teeth to swing rearward until they assume the position which admits of the bundle rolling therefrom, the teeth trailing to the rear and swinging laterally from under the bundles toward the machine.

It will be observed that each tooth has a double or compound movement—that is to say, a motion around a vertical and also a motion around a horizontal axis.

I do not claim broadly herein a series of sheaf-carrying fingers so hinged that they may swing downward and rearward from their receiving position, this construction, broadly considered, being the subject-matter of the original application hereinbefore referred to.

I represents a stationary arm or guard extending outward from the binder and rearward above the outer edge of the carrier to prevent the accidental escape of the sheaves. This device forms no part of the present invention, being claimed in the original application, hereinbefore referred to.

Having thus described my invention, what I claim is—

1. In combination with a harvesting and binding machine, a series of laterally-projecting sheaf-receiving fingers individually connected thereto by vertical and also by horizontal axes.

2. In a sheaf-carrier, the upright crank-shafts F, in combination with the series of sheaf-receiving fingers connected thereto by horizontal axes, the bar G, connecting said shafts, and the inclined cams or tracks H to control the vertical movement of the teeth.

3. A sheaf-carrier composed of a series of vertically and horizontally swinging teeth, each combined with an inclined track or cam, H, and a counter-weight, $e^2$, to lift them clear of the ground when relieved from the weight of the sheaves.

4. In combination with a grain harvesting and binding machine, a series of sheaf-receiving fingers projecting normally in a lateral direction therefrom, a series of upright shafts to which the respective fingers are connected by horizontal pivots, a bar connecting the upright shafts, and operating devices extending from said bar to a point adjacent to the driver's seat.

5. In a sheaf-carrier, a series of fingers each secured to its supporting-bar by means of a joint turning upon two axes.

6. In a sheaf-carrier, sheaf-supporting fingers independently pivoted to a supporting-bar by means of double joints.

7. In a sheaf-carrier, a series of fingers independently pivoted to a supporting-bar by means of double joints, in combination with trip mechanism.

In testimony whereof I hereunto set my hand, this 5th day of July, 1888, in the presence of two attesting witnesses.

LUCIEN W. ELLIS.

Witnesses:
C. M. BROWN,
S. C. BROWN.